Dec. 17, 1940.   C. E. MEYERHOEFER   2,225,072
CONSTANT SPEED GOVERNOR
Filed Sept. 3, 1938
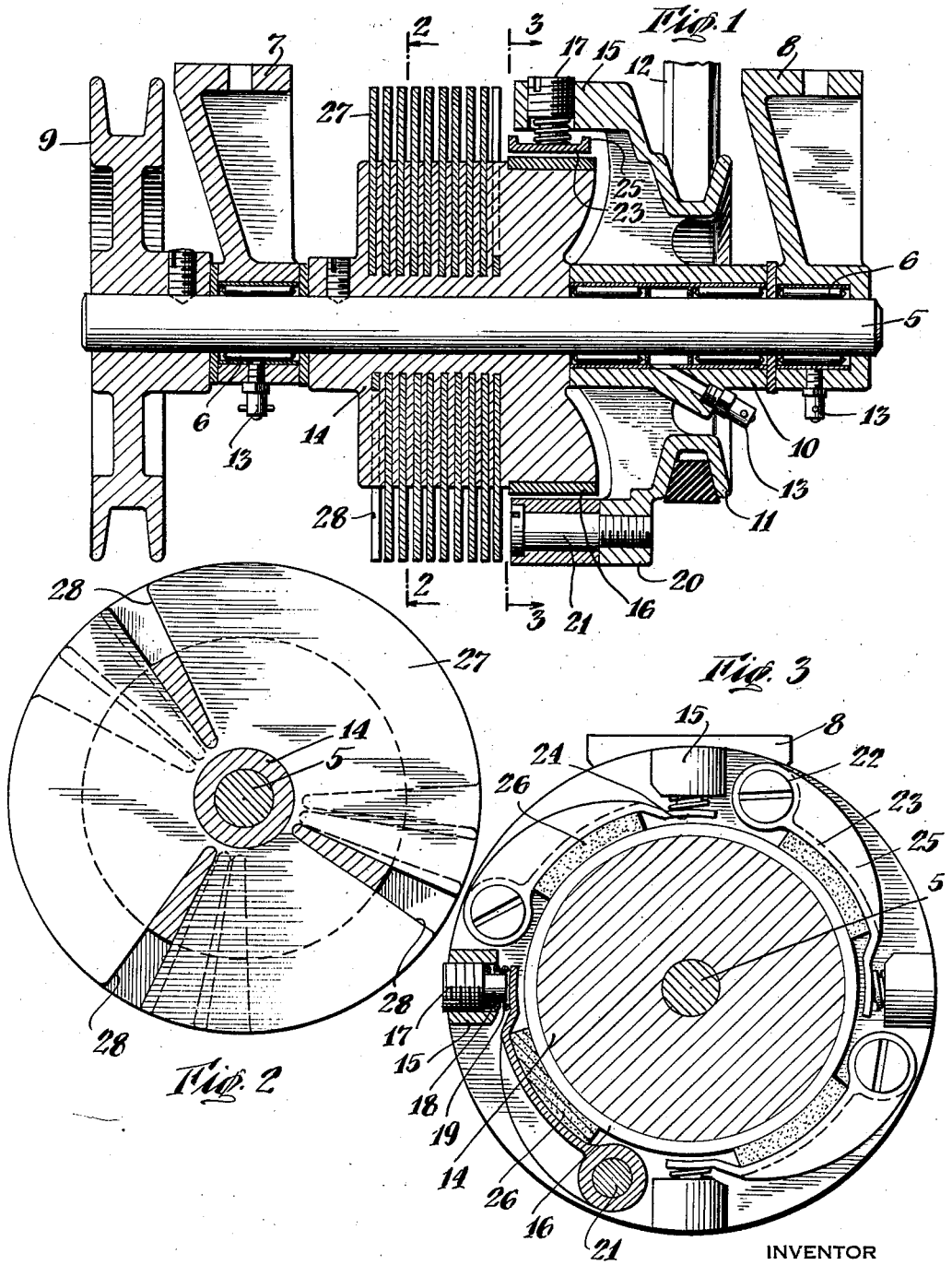
INVENTOR
Carl E. Meyerhoefer
BY
Duell, Kane and Smoot
ATTORNEYS Patented Dec. 17, 1940

2,225,072

UNITED STATES PATENT OFFICE 2,225,072

CONSTANT SPEED GOVERNOR

Carl E. Meyerhoefer, Brooklyn, N. Y., assignor to E. A. Laboratories, Inc., Brooklyn, N. Y., a corporation of New York Application September 3, 1938, Serial No. 228,463

5 Claims. (Cl. 192—104)

This invention relates to a structurally and functionally improved governor.

While the present invention may be employed in numerous different associations, it is primarily intended for use where it is desired to drive a unit below or at a certain predetermined speed and by means of a driving unit which may well exceed such driving speed.

As such, the invention lends itself ideally to the provision of an improved unit which may be employed in association with internal combustion motors which are employed with various types of vehicles and to drive such units as compressors, pumps, or otherwise.

A further object is that of furnishing a unit of this type which will drive a mechanism coupled to the same at a predetermined speed and then will maintain that speed regardless of any excessive speed at which a driving mechanism functions.

A still further objects is that of furnishing a governor which may be operated under conditions such as aforenoted, for long periods of time, and without damage to the parts, and in which, when any parts require attention this may be effected with minimum effort and time.

An additional object is that of furnishing a unit of this type, the parts of which will be relatively simple and economical to construct, susceptible to assemblage by unskilled labor, and of such compact nature that the unit may readily be disposed in confined spaces.

With these and other objects in mind, reference is had to the attached sheet of drawings, illustrating one practical embodiment of the invention and in which:

Fig. 1 is a sectional side view of a governor, and

Figs. 2 and 3 are transverse sectional views taken along lines 2—2 and 3—3, respectively, and in the direction of the arrows of Fig. 1.

Referring primarily to Fig. 1, it will be seen that the numeral 5 indicates a shaft which, by means of suitable anti-friction bearings 6, is rotatably supported by brackets 7 and 8. Secured to the shaft adjacent one of its ends is a pulley 9, suitable for an engagement by a belt and encircling said shaft adjacent its opposite end, is a sleeve member 10 presenting a pulley portion 11 which may be engaged by a belt 12. This sleeve is also mounted upon anti-friction bearings and fittings 13 may be provided so that all bearings may be properly lubricated.

At this time it is to be understood that while pulleys 9 and 11 have been shown as conveniently providing the driving and driven members of the governor, any desired substitute units of well known character might be employed. Likewise, brackets 7 and 8 have been designed primarily having in mind the fact that the unit will ordinarily be mounted by the block of an automobile engine. It is apparent that the construction of these units may also be varied as desired.

Interposed between sleeve 10 and bracket 7 is a hub member 14 which is secured to the shaft 5. Pulley 11 is formed with extended portions 15 which overlie an adjacent portion of the hub and in this zone the hub mounts a ring 16 preferably formed of steel. Each of the portions 15 is tapped and threaded to receive a screw 17 which, as shown, is preferably formed with an extension 18 encircled by a spring 19. The aggregate area occupied by the convolutions of these springs when compressed should be slightly less than the height of the extension 18 although in certain instances these may be substantially equal. As shown, extensions 15 are four in number and disposed immediately adjacent the same pulley 11 is provided with hubs 20 which mount pins 21. Rotatably encircling each of these pins are sleeves 22 formed adjacent one end of levers 23, the opposite end of these levers terminating in extended portions 24 underlying the extensions and springs 18 and 19.

Each of levers 23 is preferably reinforced by a flange or rib 25 and is curved to correspond to the degree of curvature of ring 16. Secured to the inner faces of these levers are sections of material 26 which may be formed of a substance such as high quality brake lining or clutch facing. In any event, it will be understood that with the parts in their normal position, springs 19 will cause the inner faces of lining sections 26 to firmly engage ring 16 so that as pulley 9 or its equivalent rotates shaft 5 and accordingly hub 14, the ring will rotate pulley 11 or its equivalent and at the same speed. However, should the speed of rotation become excessive, the centrifugal force acting on the outer ends of levers 23 will cause the lever to swing outwardly against the compressive force of springs 19, so that a slippage will occur between sections 26 and ring 16. Obviously, such slippage will result in the generation of heat which, if not dissipated, might cause damage to the parts, especially having in mind that hub 14 is preferably constructed of die-cast metal. With this thought in mind, the major part of the hub may be encircled by heat dissipating fins provided by employing aluminum or any other suitable metal in the form of rings 27 which are conveniently formed with radial slots or notches 28. The latter are provided having in mind the hub is preferably to be die-cast and by so forming the fins, it is feasible to assemble the latter in a die and thereupon form hub 14 with the die-cast material entering the slots 28. Moreover, as shown in Figs. 1 and 2, the slots in adjacent fins or rings 27 will preferably be arranged in different zones. Accordingly, in forming the hub, no lines or areas of weakness will occur such that zones of fracture occur. Moreover, as a consequence of this structure, a fan effect is achieved such that an improved heat exchange is effected by the fins and air rushing over them.

In operation, and assuming that pulley elements 9 and 11 are employed, it will be obvious that the governor is suitably mounted and according to a preferred technique screws 17 are tightened to a point at which extensions 18 force the extended portions 24 of the levers 23 inwardly as far as may be feasible. Thereafter, set screws 17 are "backed-up" so that springs 19 act upon the extended portions 24. Of course, due to the arrangement of the parts, a firm interlock is, under these circumstances, assured between hub 14 and driven element 11. This interlock will prevail for example until the driven element 11 is rotating 1800 R. P. M., which we will assume represents the desired maximum speed of the mechanism to be driven by the governor at the time centrifugal force will cause a compression of springs 19 and regardless of how fast hub 14 rotates, the speed of 1800 R. P. M. will be maintained by the driven element. The latter does not simply function as a true slipping clutch, but rather the instant it rotates above the speed aforementioned, the coupling between the parts is released and the instant its speed diminishes to a point below that stated the coupling is re-established so that in effect a series of intermittent gripping actions come into effect; this being particularly noticeable at high speeds on the part of shaft 5 and it will be understood that it occurs regardless of the load imposed upon the driven element.

These results obtain incident to the fact that the levers are preferably mounted upon the driven element and it will, of course, be understood that the heat generated will be quickly transmitted to the fins and thus dissipated.

Thus among others, the several objects of the invention as afore noted are achieved. Obviously, numerous changes in construction and rearrangements of the parts might be resorted to without departing from the spirit of the invention as defined by the claims.

Having described my invention, what I claim as new and desire to secure by Letters Patent is:

1. A governor including a hub, a driven member extending adjacent said hub, a lever pivotally supported by said driven member, a set screw carried by said driven member and engageable with said lever to force the same towards said hub, and a spring associated with said screw and engaging said lever to oppose the latter in its tendency to swing away from said hub and into contact with the end of said screw when the parts are rotated.

2. A governor including a hub, a driven member, portions of said driven member extending adjacent the hub, a plurality of levers having one of their ends pivotally supported by said driven member, means carried by said driven member and engaging the opposite ends of said levers to force the latter towards said hub, and heat dissipating means associated with said hub, and including a plurality of notched fins inset into said hub, said fins furnishing in aggregate an air impelling structure to cause a flow of air over said levers and hub to cool the same.

3. A governor including a hub, a driven member, portions of said driven member extending adjacent the hub, a plurality of levers having one of their ends pivotally supported by said driven member, means carried by said driven member and engaging the opposite ends of said levers to force the latter towards said hub, and heat dissipating means associated with said hub, and including a plurality of notched fins inset into said hub and the notches of adjacent fins being disposed in different planes.

4. A governor including a hub, a driven member extending adjacent said hub, a lever pivotally supported by said driven member and extending in the direction of the path of rotation thereof, a set-screw carried by said driven member and lying in a plane bi-secting said hub, said screw being engageable with the free end of said lever to urge the same toward said hub, and a spring engaging said lever adjacent the point of contact of said set-screw with said end and adapted to oppose the tendency of said lever to swing outwardly on its pivot during rotation of the parts.

5. A governor including a hub, a driven member extending adjacent said hub, a lever pivotally supported by said driven member and extending in the direction of the path of rotation thereof, a set-screw carried by said driven member and lying in a plane bi-secting said hub, said screw being engageable with the free end of said lever to urge the same toward said hub, a spring engaging said lever adjacent the point of contact of said set-screw with said end and adapted to oppose the tendency of said lever to swing outwardly on its pivot during rotation of the parts, and friction means interposed between said hub and said lever, said friction means serving to couple said hub and said driven member for unitary movement up to a pre-determined rate of rotation.

CARL E. MEYERHOEFER.